United States Patent Office 2,955,653
Patented Oct. 11, 1960

2,955,653
GRAVEL PACKING SHALE FORMATIONS

Jack L. Cain, New Orleans, La., assignor to Texaco Inc., a corporation of Delaware No Drawing. Filed Dec. 10, 1957, Ser. No. 701,731

8 Claims. (Cl. 166—20)

This invention relates to gravel packing. More particularly, this invention relates to the use of an improved carrier liquid in gravel packing operations.

Gravel packing is employed in the petroleum industry to maintain the productivity of a well. In gravel packing, a bed of gravel or a mass of relatively porous granular material such as sand is deposited in a well bore adjacent the petroleum producing formation. Gravel packing is employed to maintain or stabilize incompetent formations and/or to maintain productivity of a producing well which otherwise might sand up with resulting diminished productivity. In a gravel packing operation it has been the practice heretofore to employ water or brines such as formation brines and the like as the carrier liquid for depositing gravel within the well bore.

In those instances wherein the well being gravel packed produces from a petroleum bearing formation which contains zones or streaks of hydratable shales and the like it is desirable to employ a carrier liquid which does not hydrate such hydratable shaley materials within the formation during the gravel packing operation. To this end, concentrated brines or aqueous solutions of calcium chloride, sodium chloride or mixtures thereof have been proposed to be employed as the carrier liquid in such gravel packing operations. These liquids, however, although they are effective to prevent shale hydration and swelling, do not improve the structural strength of the shale itself. Accordingly, after a period of time the shaley materials break down and eventually tend to plug up the treated producing well. When this occurs the well must again be reworked and gravel packed.

Accordingly, it is an object of this invention to provide an improved gravel packing operation.

Another object of this invention is to provide an improved gravel packing carrier liquid.

Still another object of this invention is to provide a gravel packing operation wherein a petroleum producing formation containing hydratable shaley materials is gravel packed while employing as the carrier liquid a liquid which not only prevents the hydration of hydratable shaley materials within the petroleum producing formation in communication with the well undergoing gravel packing but which also tends to harden or otherwise structurally stabilized such shaley materials.

Still another object of this invention is to provide a gravel packing operation employing as the carrier liquid an aqueous solution which tends to render more permeable petroleum producing formations in communication with the well being gravel packed and which are characterized by the presence of streaks or zones of the hydratable shaley material therein.

These and other objects of this invention will become apparent in the light of the accompanying disclosure.

In accordance with this invention it has been discovered that an alkaline aqueous solution having a pH not in excess of 12.6, said solution being saturated with calcium hydroxide and having a calcium ion or dissolved calcium concentration in excess of 200 parts per million by weight (p.p.m.), based on said solution, is advantageously and effectively employed in a gravel packing operation as the carrier liquid for the gravel to be deposited within the well. Further, in accordance with this invention, the relatively high dissolved calcium concentration in the alkaline aqueous phase may be obtained by dissolving in said aqueous phase a water soluble calcium salt which has a solubility in water greater than that of calcium hydroxide in an amount sufficient to yield the desired dissolved calcium or calcium ion concentration.

It has been discovered that hydratable shaley materials, such as so-called heaving shales, upon contact with an alkaline aqueous solution having the characteristics above described are not only prevented from swelling and disintegrating but also undergo hardening and are transformed after a period of time, about 24–168 hours depending upon the temperature, higher temperatures accelerating the hardening process, into a cement-like or rock-like material. Further, it has been observed that some shrinkage of the resulting treated and hardened shaley material occurs. This shrinkage contributes to increasing and improving the permeability of the producing formation containing such hydratable shaley materials.

Any suitable water soluble salt which has a solubility in water greater than that of calcium hydroxide, e.g. a solubility in water measured at about 20° C., may be employed in the practice of this invention to increase the concentration of dissolved calcium in the carrier liquid of this invention. Suitable water soluble calcium salts include calcium chloride, calcium nitrate, calcium sulfate, calcium acetate and calcium formate. Other suitable water soluble salts are known and may be employed in the practice of this invention.

The aqueous solution employed in the practice of this invention is alkaline since it is saturated with respect to calcium hydroxide. Calcium hydroxide may be added per se, together or separately with the water soluble calcium salt, in the preparation of a carrier liquid in accordance with this invention. Also, calcium hydroxide may be generated in situ by the addition of burnt lime, CaO, to water or by metathetical reaction between a water soluble calcium salt such as calcium chloride and an alkali metal hydroxide such as sodium hydroxide, calcium chloride preferably being present in an excess with respect to sodium hydroxide. Therefore, the carrier liquid in accordance with this invention may be prepared in the first instance by the addition of a water soluble calcium salt such as calcium chloride and an alkali metal hydroxide such as sodium hydroxide to water. The amounts of calcium chloride and sodium hydroxide added being sufficient to yield an alkaline aqueous solution which is saturated with calcium hydroxide and contains a residual dissolved calcium chloride (dissolved calcium or calcium ion) sufficient to yield a calcium ion concentration in excess of 200 p.p.m.

A pH of 12.6, which pH corresponds to the pH of saturated aqueous solution of calcium hydroxide, is the upper limiting pH of a carrier liquid prepared in accordance with this invention. An alkaline aqueous solution in accordance with this invention having a lower pH, such as a pH in the range 10.2–11.6 depending upon the concentration of dissolved calcium in the solution, yields a suitable and effective carrier liquid.

The lower limiting value of the calcium ion or dissolved calcium concentration in the alkaline aqueous phase is about 200 p.p.m. Effective results are obtainable when the dissolved calcium or calcium ion concentration in the alkaline aqueous phase is in the range 300–2500 p.p.m., more or less. For instance, satisfactory results are obtainable when a calcium ion concentration as high as 25,000 p.p.m. is present in the alkaline aqueous phase.

A suitable alkaline aqueous carrier liquid for use in a gravel packing operation in accordance with this invention may be obtained by the mere addition of lime and, if desirable, a relatively water soluble calcium salt in amounts in excess of one pound per barrel of water (42 gallons per barrel) respectively. Generally, the addition of lime and calcium chloride, respectively, in amounts in a range 1–5 pounds per barrel of aqueous solution yields a satisfactory carrier liquid.

During the actual gravel packing operation the carrier liquid in accordance with this invention is employed in a usual and conventional manner. For example, gravel or sand is mixed with the alkaline aqueous carrier liquid and the resulting admixture pumped into the well bore which may or may not contain a well screen therein, with the eventual formation of a gravel pack surrounding the outside of a well screen within the well bore adjacent the petroleum producing formation. The alkaline aqueous carrier liquid is returned to and recovered at the surface substantially free of gravel during the gravel packing operation. However, the alkaline aqueous solution thus introduced into the well bore to form a gravel pack therein need not be recovered on the surface. For example, some of the alkaline aqueous solution may in the normal course of events be lost into the petroleum producing formation. In other instances it may be desirable to apply pressure upon the carrier liquid or admixture of gravel and carrier liquid within the well bore to force some of the solution and, if desirable, together with some of the gravel into the petroleum producing formation so as to consolidate or otherwise improve the productivity of the petroleum producing formation undergoing treatment.

Still, in some instances, it may be desirable prior, during or subsequent to the gravel packing operation to fracture hydraulically the petroleum producing formation undergoing treatment by impressing upon the alkaline aqueous solution or carrier liquid which may or may not contain gravel or sand, such as Ottawa sand, admixed therewith, a pressure sufficient to fracture the formation with the result that the formation is fractured and permeated by the carrier liquid, the gravel, if present, being deposited with the resulting fracture. The resulting fractured formation is gravel packed while employing the alkaline aqueous solution as the carrier liquid for the gravel packing operation. A formation thus treated, i.e., pressure gravel packed or fractured and gravel packed is permeated for a substantial radial extent surrounding a well bore with the treating solution of this invention with the result that any hydratable shaley materials therein are contacted and stabilized and hardened so that when the petroleum production for the formation and well is resumed, petroleum production therefrom at a relatively high rate is possible for a greater period of time.

In some instances it may be desirable to employ an aqueous drilling fluid or mud as the carrier liquid in a gravel packing operation. The employment of an aqueous drilling mud which contains finely divided hydratable clay dispersed and suspended in the aqueous phase thereof as the carrier liquid in a gravel packing operation is possible in accordance with the practice of this invention provided the aqueous or filtrate phase of the drilling mud meets the requirements set forth herein, viz. is saturated with calcium hydroxide and contains a calcium ion or dissolved calcium concentration of at least 200 p.p.m.

As will be apparent to those skilled in the art, many modifications and variations are possible in the practice of this invention without departing from the spirit or scope thereof.

I claim:

1. In a gravel packing operation wherein a carrier fluid is employed to deposit gravel within a well bore penetrating an underground formation containing hydratable shaley material the improvement which comprises employing as said carrier fluid an alkaline aqueous solution having a pH not in excess of 12.6, said solution being saturated with respect to calcium hydroxide and containing a calcium ion concentration in excess of 200 parts per million by weight based on said solution.

2. In a gravel packing operation wherein a carrier liquid is employed to deposit gravel within a well bore penetrating an underground formation containing hydratable shaley material the improvement which comprises employing as said carrier liquid an alkaline aqueous solution having a pH not in excess of 12.6, said solution being saturated with respect to calcium hydroxide and containing dissolved therein a water soluble calcium salt having a solubility greater than that of calcium hydroxide to yield a dissolved calcium ion concentration in said solution in excess of 200 parts per million by weight.

3. A method in accordance with claim 2 wherein said water soluble calcium salt is calcium chloride.

4. A method in accordance with claim 2 wherein said alkaline aqueous solution is produced by adding lime and said water soluble calcium salt in amounts in excess of 1 lb. per barrel of solution, respectively.

5. A method in accordance with claim 2 wherein said alkaline aqueous solution is obtained by adding to water an amount of lime and a water soluble calcium salt in the range of 1–5 lbs. per barrel of water and 1–5 lbs. per barrel of water, respectively.

6. A method of treating a petroleum producing formation containing hydratable shaley material therein which comprises hydraulically fracturing said formation by impressing upon a liquid in contact with said formation a pressure sufficient to fracture said formation, said liquid being an alkaline aqueous solution having a pH not in excess of 12.6, being saturated with calcium hydroxide and containing a calcium ion concentration in excess of 200 p.p.m. based on such a solution.

7. A method of treating a petroleum producing formation containing hydratable shaley material penetrated by a well bore which comprises introducing into said well bore an alkaline aqueous solution, impressing upon said alkaline aqueous solution within said well bore a pressure sufficient to fracture hydraulically said formation, subsequently gravel packing the resulting fractured formation surrounding said well bore by introducing into said well bore into contact with said formation an admixture of gravel in said solution, said solution having a pH not in excess of 12.6, being substantially saturated with calcium hydroxide and having a calcium ion concentration in excess of 200 p.p.m. based on said solution.

8. A method of treating a petroleum producing formation containing hydratable shaley material penetrated by a well bore which comprises introducing into said well bore into contact with said formation an admixture comprising solid granular material and an alkaline aqueous solution, said solution having a pH not in excess of 12.6 consisting essentially of calcium hydroxide dissolved therein in an amount sufficient to saturate said solution and an amount of a water soluble calcium salt having a solubility greater than that of calcium hydroxide dissolved therein to yield a calcium ion concentration in excess of 200 p.p.m. based on said solution, and impressing upon said admixture within said well bore a pressure sufficient to force some of said admixture into said formation.

References Cited in the file of this patent

UNITED STATES PATENTS

| | | |
|---|---|---|
| Re. 21,916 | Vietti | Sept. 30, 1941 |
| 2,285,291 | Larson | June 2, 1942 |
| 2,699,213 | Cardwell | Jan. 11, 1955 |